May 11, 1926.

R. J. BUTLER

MOTOR CONTROL SYSTEM

Filed Feb. 20, 1922

1,584,608

WITNESSES:

INVENTOR
Reginald John Butler.
BY
ATTORNEY

Patented May 11, 1926.

1,584,608

UNITED STATES PATENT OFFICE.

REGINALD JOHN BUTLER, OF STRETFORD, MANCHESTER, ENGLAND, ASSIGNOR TO WESTINGHOUSE ELECTRIC & MANUFACTURING COMPANY, A CORPORATION OF PENNSYLVANIA.

MOTOR-CONTROL SYSTEM.

Application filed February 20, 1922. Serial No. 537,886.

My invention relates to motor-control systems and it has particular relation to the regulation of electric motors of the compound wound type.

The object of my invention is to provide automatic regulation of the speed of a motor without employing hand control or automatically operated switches.

In certain industrial applications such as, for instance, in connection with rolling mills, a compound-wound direct-current motor is used, the two field-magnet windings assisting one another, so that a drop in speed may occur with increase in load. It is found in these cases that the relative proportions of series and shunt excitation that give satisfactory characteristics when the motor is running at a low speed, are not suitable when the motor is running at a high speed. Consequently, it has been the practice to provide resistors, connected in parallel relation with the series field-winding and capable of being connected in circuit, section by section, by successively operated switches. These resistors and co-operating switches carry large currents and are therefore heavy and costly accessories. Further, a hand control is required, as the operator must adjust the degree of compounding, for the speed at which the motor is to run, by closing the appropriate switches.

According to my invention, a compound-wound motor, as above specified, is coupled to an exciter, which is driven at a speed proportional to that of the main motor to be regulated, for instance by a direct coupling or a belt or other gearing, and the field-excitation of the exciter is caused to vary in proportion to variations in the value of the main motor currents. The exciter supplies current to a field-magnet winding of the motor so as to reduce the field flux thereof upon increase of load. By this means the field flux will be varied so as to be of maximum strength at a low motor speed and to be decreased automatically as the motor speed increases.

Figure 1:
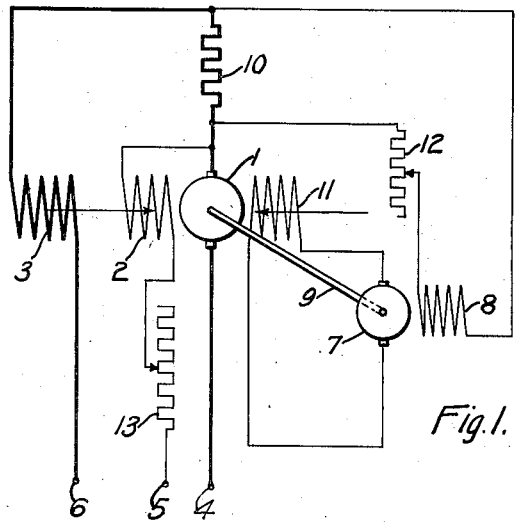
Figure 2:
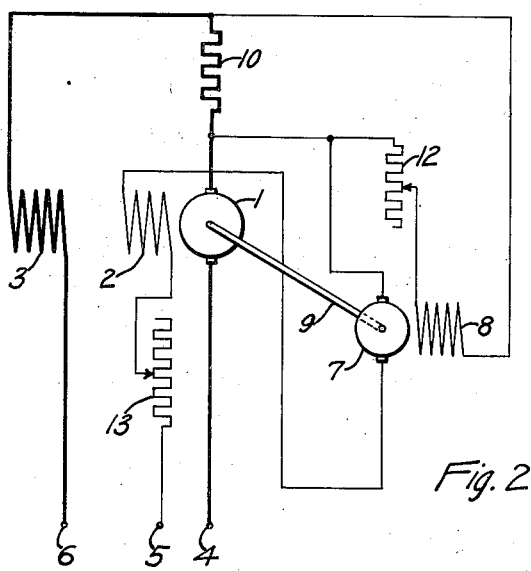

My invention will be clearly understood by reference to the accompanying drawing, in which Fig. 1 is a diagrammatic view of circuits and apparatus embodying my invention, and Fig. 2 is a similar view of a modification of the system illustrated in Fig. 1.

In the drawing, the systems here shown comprise a motor having an armature 1, a shunt field-magnet winding 2 and a series field-magnet winding 3. The motor terminals 4, 5 and 6 are preferably connected to a source of supply through a starter (not shown), as is well understood. An exciter for said motor comprises an armature 7 and a field winding 8. The exciter armature 7 is driven at a speed proportional to the speed of the motor, being preferably directly coupled to the armature 1 of the motor by a shaft 9, although it will be understood that the armature 7 may be driven by means of a belt, toothed gearing or in any other manner.

The field winding 8 of the exciter is shown as connected across a resistor 10, constituting part of the main series circuit of the motor, so that the field winding 8 is excited in proportion to the value of the current flowing in the series circuit of the motor. It will be understood that this proportional excitation of the exciter field winding may be obtained in other ways than by means of the resistor 10, as, for example, by connection in shunt relation to the series field winding 3.

In Fig. 1, the armature 7 of the exciter is shown as connected to an extra field winding 11 of the motor in such manner that the flux set up by field winding 11 opposes the flux created by series field winding 3.

In Fig. 2, the armature 7 of the exciter is connected in opposing series relation with the shunt field winding 2, the extra field winding 11 being omitted. The result in either case is to reduce the field flux of the motor as the load upon the motor increases.

With the arrangement above described, the effect of the series field winding 3 of the motor will be varied by means of the exciter in such manner that this effect is large at a low speed and is decreased automatically as the speed of the motor increases.

For further regulation, if desired, rheostats or regulators 12 and 13 may be included in circuit with the field windings 8 and 2, respectively.

In the arrangement shown in Fig. 2, since the action of the exciter increases with increase in the speed of the motor, the effect of series field winding 3 may be increased to a small extent beyond the value necessary to give the correct compounding at the lowest speeds, in order to neutralize the effect of the exciter at these speeds. The field regulator 12 may be provided for the exciter field winding 8 and in addition, or alternatively, a regulator (not shown) may be provided in the circuit of the exciter armature 7. Either of such regulators may be controlled jointly with the shunt field regulator 13, for the main motor, by means of a common operating mechanism or through interlocking means of any suitable form.

I claim as my invention:

1. The combination with a compound-wound direct-current motor having an extra field-magnet winding, of an exciter therefor coupled to the motor, and means including said exciter for controlling said motor in accordance with the value of current traversing said motor.

2. The combination with a compound-wound direct-current motor having an extra field-magnet winding, of an exciter therefor coupled to the motor and having a field-magnet winding energized in accordance with the value of current traversing said motor.

3. The combination with a motor having shunt and series field-magnet windings, and means for limiting the armature current, of an extra field-magnet winding energized in accordance with the value of current traversing said means for controlling the speed of the motor.

4. The combination with a motor having shunt and series field-magnet windings, and a resistor for limiting the armature current, of an extra field-magnet winding energized in accordance with the voltage across said resistor for partially neutralizing the effect of the series field-magnet winding.

5. The combination with a compound-wound direct-current motor having an extra field-magnet winding, of an exciter coupled to the motor for energizing said extra field-magnet winding and having a field-magnet winding energized in accordance with the value of current traversing said motor.

6. The combination with a compound-wound motor having an extra field-magnet winding for partially neutralizing the effect of the series field-magnet winding, of an exciter coupled to the motor for energizing said extra field-magnet winding and having a field-magnet winding controlled in accordance with the value of current traversing said motor.

7. The combination with a compound-wound motor, of controlling means therefor comprising an exciter, the armature of which is in opposing series relation with one of the field-magnet windings of said motor, means for limiting the motor armature current and means for subjecting the field-magnet winding of the exciter to variations in the value of current traversing said current limiting means.

In testimony whereof, I have hereunto subscribed my name this 26th day of January, 1922.

REGINALD JOHN BUTLER.